US009870360B1

(12) United States Patent
Bilinski et al.

(10) Patent No.: US 9,870,360 B1
(45) Date of Patent: *Jan. 16, 2018

(54) SHARED METADATA FOR MEDIA FILES

(71) Applicant: Google Inc., Mountain View, CA (US)

(72) Inventors: Brandon Bilinski, San Francisco, CA (US); Clement D. Wright, San Francisco, CA (US); Kathleen Hsiang Chen, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,034

(22) Filed: Sep. 4, 2015

Related U.S. Application Data

(63) Continuation of application No. 14/139,412, filed on Dec. 23, 2013, now Pat. No. 9,152,677, which is a continuation of application No. 13/175,555, filed on Jul. 1, 2011, now Pat. No. 8,639,706.

(51) Int. Cl.
*G06F 7/00* (2006.01)
*G06F 17/30* (2006.01)
*H04L 12/58* (2006.01)

(52) U.S. Cl.
CPC .... *G06F 17/30029* (2013.01); *G06F 17/3053* (2013.01); *G06F 17/30053* (2013.01); *G06F 17/30345* (2013.01); *G06F 17/30598* (2013.01); *H04L 51/10* (2013.01)

(58) Field of Classification Search
CPC ........... G06F 17/3053; G06F 17/30867; G06F 17/30554; G06F 17/30864; G06F 17/30528

USPC ......................................................... 707/723
See application file for complete search history.

(56) References Cited

U.S. PATENT DOCUMENTS

| 6,748,395 | B1 * | 6/2004 | Picker ................ G06Q 30/0209 |
| 7,461,090 | B2 * | 12/2008 | Blinn ................ G06F 17/30038 |
| 7,617,295 | B1 * | 11/2009 | Farber .................... G06Q 30/02 709/203 |

(Continued)

FOREIGN PATENT DOCUMENTS

WO    2008027924 A2    3/2008

OTHER PUBLICATIONS

Apple iTunes http://www.apple.com/itunes/what-is/ (last visited Jun. 29, 2011).

(Continued)

*Primary Examiner* — Hosain Alam
*Assistant Examiner* — Nicholas Allen
(74) *Attorney, Agent, or Firm* — Morris & Kamlay LLP (57) ABSTRACT

Methods, systems, and apparatus, including computer program products, for organizing music tracks based on shared metadata. In one aspect, a method includes identifying a set of common music tracks associated with a first user and a second user, wherein the set of common music tracks includes at least one music track present in both a first set of music tracks associated with the first user and a second set of music tracks associated with the second user. Metadata associated with at least one music track in the set of common music tracks is retrieved, the metadata being specific to the second user. A set of user music tracks associated with the first user is organized based on the retrieved metadata.

17 Claims, 8 Drawing Sheets

(56) References Cited

U.S. PATENT DOCUMENTS

| | | | |
|---|---|---|---|
| 7,884,274 B1* | 2/2011 | Wieder | G06F 17/30766 360/55 |
| 2002/0120925 A1* | 8/2002 | Logan | A23L 1/3002 725/9 |
| 2002/0152278 A1* | 10/2002 | Pontenzone | H04H 20/42 709/217 |
| 2004/0143590 A1* | 7/2004 | Wong | G06F 17/30997 |
| 2004/0255340 A1* | 12/2004 | Logan | G11B 27/105 725/145 |
| 2005/0165726 A1* | 7/2005 | Kawell, Jr. | H04L 29/06 |
| 2005/0249080 A1* | 11/2005 | Foote | G06F 17/30743 369/59.1 |
| 2006/0143236 A1* | 6/2006 | Wu | G06F 17/30053 |
| 2006/0195480 A1* | 8/2006 | Spiegelman | G06F 17/30766 |
| 2006/0242139 A1* | 10/2006 | Butterfield | G06F 17/30265 |
| 2006/0242178 A1* | 10/2006 | Butterfield | G06F 17/30038 |
| 2007/0162298 A1* | 7/2007 | Melton | G06F 17/30864 715/234 |
| 2007/0244880 A1* | 10/2007 | Martin | G06F 17/30038 |
| 2008/0005179 A1* | 1/2008 | Friedman | G06F 17/30749 |
| 2008/0052739 A1* | 2/2008 | Logan | A23L 1/3002 725/25 |
| 2008/0141134 A1* | 6/2008 | Miyazaki | G11B 27/105 715/716 |
| 2008/0168055 A1* | 7/2008 | Rinearson | G06F 17/30997 |
| 2008/0201000 A1* | 8/2008 | Heikkila | H04N 7/16 700/94 |
| 2009/0070363 A1* | 3/2009 | Bull | G11B 27/34 |
| 2009/0125571 A1* | 5/2009 | Kiilerich | G06F 17/30017 |
| 2009/0222392 A1* | 9/2009 | Martin | G11B 27/105 706/46 |
| 2009/0240732 A1* | 9/2009 | Amidon | G11B 27/105 |
| 2009/0249222 A1* | 10/2009 | Schmidt | H04N 21/2368 715/751 |
| 2010/0057694 A1* | 3/2010 | Kunjithapatham | G06F 17/30781 707/E17.009 |
| 2010/0223259 A1* | 9/2010 | Mizrahi | G06F 17/30887 707/723 |
| 2011/0066503 A1* | 3/2011 | Kanapur | G06Q 30/0267 705/14.64 |
| 2011/0208732 A1* | 8/2011 | Melton | G06F 17/30896 707/728 |
| 2013/0191454 A1* | 7/2013 | Oliver | G06Q 10/10 709/204 |

OTHER PUBLICATIONS

Grooveshark, http://groveshark.com/ (last visited Jun. 29, 2011).
International Preliminary Report on Patentability for International Application No. PCT/US2012/044918, dated Jan. 16, 2014. (6 pages).
International Search Report and Written Opinion, received in corresponding International Patent Application No. PCT/US2012/044918, dated Sep. 3, 2012, (9 pages).
Last FM, http://www.last.fm/ (last visited Jun. 29, 2011).
RDIO.com http://rdio.com (last visited Jun. 29, 2011).

* cited by examiner

| | FRIEND'S PLAYS ↑ | PLAYS | FRIEND'S LAST PLAYED | LAST PLAYED | FRIEND'S RATING | RATING |
|---|---|---|---|---|---|---|
| 322 → | 12 | 6 | 3/1/11 | 1/9/11 | | |
| 324 → | 8 | 33 | 9/3/07 | 3/15/10 | 👍 | |
| 326 → | 3 | 10 | 2/2/10 | 8/2/11 | | 👍 |
| 328 → | 6 | 2 | 12/12/10 | 1/1/10 | | |

Column labels: 312, 314, 316, 318, 319, 320

| BARRY BRAXTON 308 | | 312 |
|---|---|---|
| NAME | ARTIST | FRIEND'S PLAYS ↑ |
| Neighborhood #1 (Tunnels) | The Arcade Fire | 33 |
| Lean On Me | Bill Withers | 12 |
| The Lonesome Death Of Hattie Carroll | Bob Dylan | 11 |
| You Keep Me Hanging On | Bonnie and Sheila | 10 |
| Born To Run | Bruce Springsteen | 9 |
| Helpless | Crosby, Stills, Nash & Young | 8 |
| Paper Planes | M.I.A. | 8 |
| Heart of Gold | Neil Young | 7 |
| Southern Man | Neil Young | 6 |

SHARED METADATA FOR MEDIA FILES

RELATED APPLICATIONS

The subject application is a continuation application of U.S. patent application Ser. No. 14/139,412, filed on Dec. 23, 2013, which is a continuation application of U.S. patent application Ser. No. 13/175,555, filed on Jul. 1, 2011, the entire content of which is herein incorporated by reference.

TECHNICAL FIELD

This disclosure relates to shared metadata for media files.

BACKGROUND

Multimedia files such as audio or video files may be played based on a user's personal preference or ranking. For example, certain songs can be included in a particular playlist based on the user's selection. Further, the order in which the songs are played may also be based on the user's preference. In some instances, the user's preferences are embodied in metadata associated with each media file. The metadata can include general information about a particular media file, such as an author, title, or genre associated with the media file, as well as user-specific information, such as a user's personal rating of the media file, the user's personal categorization of the media file, or a date/time that the media file was last played, for example. The metadata associated with a media file may be stored with the media file as tags. In some instances, users can also share media files with other users or view other users' media files.

SUMMARY

In general, one aspect of the subject matter described in this specification can be embodied in methods that include the actions of identifying a set of common music tracks associated with a first user and a second user, wherein the set of common music tracks includes at least one music track present in both a first set of music tracks associated with the first user and a second set of music tracks associated with the second user; retrieving metadata associated with at least one music track in the set of common music tracks, the metadata being specific to the second user; and organizing a set of user music tracks associated with the first user based on the retrieved metadata.

These and other embodiments can optionally include one or more of the following features. Retrieved metadata for the at least one music track in the set of common music tracks contains information regarding at least one category, the at least one category including a date the particular music track was last played by the second user, a number of times the particular music track has been played by the second user, or a rating of the particular music track by the second user. Organizing the set of user music tracks includes displaying at least a portion of the set of user music tracks in an order based on the at least one category. Organizing the set of user music tracks includes displaying data to the first user based on retrieved metadata for each of the common music tracks. A request is received from the second user to hide data based on the retrieved metadata associated with a particular music track, and display of the data to the first user is prevented. Organizing the set of user music tracks includes automatically playing music tracks in the set of user music tracks in an order based on the retrieved metadata, including playing the music tracks based on metadata associated with the particular music track without displaying the metadata to the first user.

Organizing the set of user music tracks includes automatically playing music tracks in the set of user music tracks in an order based on retrieved metadata. Determining the order for playing the music tracks comprises assigning an individual score for at least one category of the retrieved metadata for at least one music track in the set of common music tracks; calculating a preference score for the at least one music track based on the individual score for the at least one category; and determining an order for playing the at least one music track based on the preference score calculated for the at least one music track. Results of the organizing of the set of user music tracks is transmitted to a client device associated with the first user, wherein the results include at least one of a playlist of at least a portion of the set of user music tracks or a display of data based on retrieved metadata. The set of common music tracks includes at least one music track shared by the first user with the second user. At least one music track in a second set of user music tracks associated with the second user that is not in the set of user music tracks associated with the first user is identified; and a suggestion to the first user for obtaining the at least one music track based on retrieved metadata for the at least one music track is presented.

Other embodiments of this aspect include corresponding systems, apparatus, and computer program products, configured to perform the actions of the methods, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies relating to shared metadata for multimedia files. Although this specification focuses on sharing metadata associated with audio files (e.g., music files), the implementations disclosed herein can be used to share metadata associated with other multimedia file types, such as video files, for example.

In some implementations, a user can organize a music collection based on usage patterns and likely preferences of other users. In particular, a user can benefit from another specific user's preference or dislike for various songs. The other user may be, for example, a friend of the user who may share similar tastes in music. For example, a user may have some songs in common with a friend, and the user may be interested in which common songs the friend prefers or listens to more frequently. Accordingly, metadata associated with the friend's preferences and history of listening to the common songs can be collected, and information represented in the metadata can be presented to the user. The user can then view the information associated with the common files and organize the user's own music files based on the metadata.

In certain instances, the user's playlist can be automatically arranged or individual songs rated based on the metadata collected from the friend. Suggested songs or playlists can also be presented to the user based on the metadata from the friend's music collection. The metadata collected from other users can include, for example, other users' personal ratings or categorization of individual songs, the play count of songs by other users, or the date a particular song was last played by other users. As used in the present specification, the play count of a particular song includes a number of times the song has been played by a particular user within a certain time period. In certain instances, however, a user may have the option of granting access to metadata of some of the user's songs while hiding access to metadata of other songs.

Figure 1:
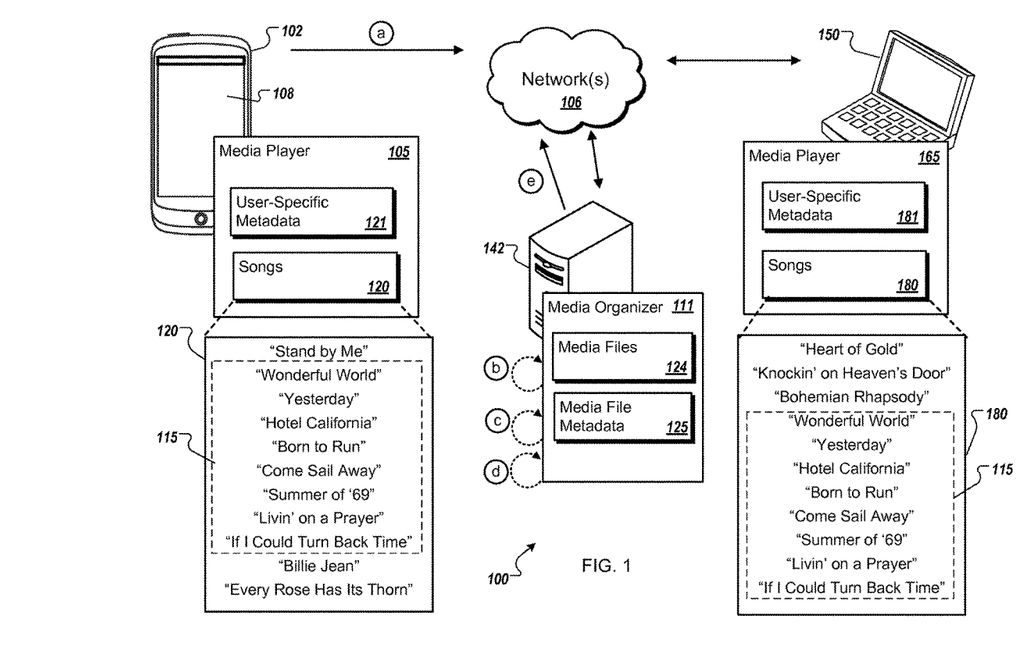
FIG. 1 is a block diagram of an example system that organizes media files based on shared metadata in accordance with an embodiment.

FIG. 1 is a block diagram illustrating an example architecture for a system 100 that organizes media files based on shared metadata. The system 100 includes a mobile device 102, which may include a processing system that may be accessed by a user interacting directly with the mobile device 102 through a graphical user interface (GUI) 108. In some instances, any appropriate computing system can be used in place of the mobile device 102, including a personal computer, laptop, PDA, tablet, or other computing device. The mobile device 102 includes a processor that can execute programs, perform data manipulations, and control tasks in the mobile device 102. The processor can execute programs and computer applications such as media player 105. In some instances, the computer applications can include a web browser or other application configured to present an interface to a user for accessing data associated with preferences of other users, such as users of other mobile devices or computing systems 150.

In some implementations, a media player application 105 performs playback of digital multimedia, including playback of streaming media and audio or video files. The digital multimedia may be remotely stored as media files 124 at a server 142, and provided to the mobile device 102 across a network 106 or stored locally at the mobile device 102. In the present example, the media player 105 is executed on the remote server 142 and provided as a hosted service to a user of mobile device 102. Alternatively, the media player 105 may also be stored and executed locally at the mobile device 102.

The media player 105 can include additional features. In certain instances, the media player 105 interfaces with a media organizer 111 module that provides functionality for organizing a user's media files 124. Although media organizer 111 is illustrated as an individual module at server 142, media organizer 111 can also be implemented as a submodule within media player 105 or as any application, widget, embedded application, sub-module, third party service, process, component, library, and the like, configured to perform the features described herein. The media organizer 111 can allow a user to save media files 124 for later playback or to edit media file metadata 125 associated with the media files 124. The metadata 125 can be represented as tags for individual media files 124 that can be stored with each media file 124. As depicted in FIG. 1, the metadata 125 is stored at the server 142 with the media files 124. The metadata 125 can also be stored separately from the media files 124, such as in a separate repository. The metadata 125 can indicate, for each media file 124, an author, title, genre, length of playback, date of composition, style, or a user's personal rating/categorization of the media file 124, for example. The metadata 125 can also include information about usage patterns of a media file 124, such as date/time of last play or a count of the number of times the media file 124 has been played (e.g., play count). Although FIG. 1 depicts media files 124 and media file metadata 125 stored at the server 142, the media files 124 and metadata 125 may be stored locally at the mobile device 102 or at the computing device 150.

In some implementations, multiple users, such as users of mobile device 102 (mobile device user) and computing device 150 (computing device user), may have their own media files 124 at the server 142. In certain instances, the media files 124 are uploaded by each user or purchased through a music service associated with server 142 at a prior time. Each of the users may own their own set of songs. For example, the mobile device user may have a set of songs 120 while the computing device user may have a different set of songs 180. Although the media files corresponding to each of the songs may be stored on the server 142, each user may be limited to playback of the set of songs belonging to that particular user. Each such user may not be permitted to play songs belonging to other users.

Further, a user's own songs may be associated with user-specific metadata providing information regarding the user's preferences for each song. Accordingly, the songs 120 belonging to the mobile device user are associated with one set of user-specific metadata 121 while the songs 180 belonging to the computing device user are associated with a different set of user-specific metadata 181. The user-specific metadata 121 and 181 may be automatically captured by the media organizer 111 during users' playback of their songs. Some items of the metadata 121 and 181 may be defined by the user directly, such as a rating of a particular song, for example. The metadata 121 and 181 may also be captured at client devices 102 or 150 and uploaded to server 142.

The user-specific metadata 121 and 181 are depicted with their respective media players 105 and 165 because, typically, the metadata associated with a particular user is utilized only with respect to that user or viewed only by the user. In some instances, however, the user-specific metadata may be shared with other users or accessed for organizing other users' media files. Accordingly, the user-specific metadata 121 and 181 may be "shared metadata" in some instances. The shared metadata 121 and 181 may be stored with their respective media files 125 at the server 142.

In certain implementations, the media files 124 may be stored locally at different client devices, such as at mobile device 102 and computing device 150, instead of at the server 142. The user-specific metadata 121 and 181 may also be stored at server 142 to allow media organizer 111 to analyze the metadata for organizing songs for users. Although FIG. 1 illustrates a computing device user with a different device than the mobile device user, multiple users can access their own media files on the server 142 through the same device. For example, two friends may access their own media files using separate accounts on the server 142 through the same mobile device 102.

A media organizer 111 can also be configured to create, edit, or share playlists containing one or more songs. A playlist can include a grouping of certain songs for sequential playback. In some implementations, media organizer 111 can interface with media files associated with other users, allowing a user to view or access media files associated with the other users. For example, mobile device 102 may communicate with server 142 over a network 106, allowing the mobile device user to view media files associated with the computing device user. Media file metadata, playlists, and other information can be shared between users.

In certain implementations, media organizer 111 is also configured to organize a user's songs 120 based on shared metadata 181 associated with other users, such as the computing device user. In general, media organizer 111 can obtain metadata associated with other users who share common songs with the user, and present suggestions to assist the user in organizing the user's songs 120. For example, the suggestions can be designed to provide guidance to the user in rating or categorizing individual songs, grouping songs together, or determining an order of playback of songs. In some instances, the media organizer 111 automatically performs some organizational functions, such as automatically generating playlists, ordering songs, or rating songs.

FIG. 1 depicts a flow of data during various states among mobile device 102 and server 142, when an example process for organizing media files based on shared metadata is performed by the system 100. The states (a) to (e) may occur in the illustrated sequence, or they may occur in a sequence that is different than the illustrated sequence.

First, as shown in state (a), a mobile device user can initiate a request to determine whether another user shares common songs with the user. A common song may be any song that is present in the music collections of a first user (e.g., mobile device user) and another user (e.g., computing device user). Although the actual media file associated with a common song may not be the same in the mobile device user's library and the computing device user's library, the same song may be represented in both music collections. In some instances, a particular song is identified as a common song if the songs in two music collections have the same title and artist name. Variations in album name between two songs may not preclude a match as a common song. Further, some sub-string variations may be accounted for to ensure that songs are identified as "common" songs when appropriate. For example, a user may have a song titled "Lean on Me" while another user has a song titled "Lean on Me (Live)." Both songs are variations of the same song and may be identified as a common song.

Metadata associated with common songs may assist users in organizing those songs. In the illustrated example, the request is sent to the media organizer 111 at server 142 to determine whether there are common songs associated with a user of computing device 150. In some implementations, potential users from which user-specific metadata may be obtained for organizing a user's media files may be identified based on the user's selection. For example, a user may select a friend from a friend list in order to determine whether the user shares common songs with the selected friend. In certain implementations, media organizer 111 may also maintain a constant record of which songs are common to which users. For example, media organizer 111 may store a particular field in the metadata 125 of each media file stored in server 142 indicating which users have the same song in their music collection. The metadata field may be updated accordingly when a particular user adds or deletes a particular song.

In some instances, the request may be a signal to the media organizer 111 that the mobile device user is currently accessing media files 124 stored on the server 142, and not an explicit request to determine common songs. At state (b), the media organizer 111 responds to the request by determining a list of the songs stored on the server 142 that are common between the two users. In certain implementations, the songs are stored as media files 124 on the server 142, and each user of the media organizer 111 may have a personal digital library of songs. Users may purchase media files from a music service provided through the server 142 or may upload personal media files to the server 142 for storage.

The media organizer 111 determines the songs that are shared between the mobile device user and the computing device user during state (b). In the present example, the mobile device user may "own" a set of songs 120 on the server 142. Although the songs 120 are stored at the server 142, the songs 120 belong to the user of mobile device 102 and may be presented and played for the user through media player 105, as illustrated in FIG. 1. The computing device user also owns a set of songs 180 stored on the server 142 and may play the songs using media player 165. Accordingly, media organizer 111 can identify a set of common songs 115 between the two song collections 120 and 180.

During state (c), the media organizer 111 extracts metadata 181 specific to the user of computing device 150 and that is associated with each song in the set of common songs 115. As illustrated in FIG. 1, the media file metadata 181 is user-specific and may provide an indication of likely preferences of the computing device user. The metadata 181 may include information regarding the frequency that each song is played, a date/time each song was last played, or a personal rating of the songs. In certain implementations, metadata 181 may also include a user's designation of particular songs that the user wants to share with all or a portion of the user's friends. The metadata 181 may include information regarding the context in which certain songs are played. For example, the locations of the computing device user at the time a particular song is played may be included in metadata 181 to determine if the user plays the song more frequently in certain locations. The location of a user may be obtained from global positioning system (GPS) data or other signals indicating a location of the user such as a check-in application that identifies a particular event, store, restaurant, or venue that the user is present at. Context information found in the metadata 181 may also include, for example, an estimated activity of a user (e.g., running, driving) while a particular song is playing, which may be determined by analysis of a user's motion during playback. As described below, a particular song may then be recommended to another user when the other user is in the same location or performing the same activity.

In some instances, the computing device user may not want to share metadata indicating a play count or personal rating of a particular song in the set of common songs 115, such as "If I Could Turn Back Time," for example. The computing device user can designate the metadata or information based on the metadata associated with "If I Could Turn Back Time" that provides information about the user's play count or personal rating of the song as hidden so that the metadata or information is not viewable by the mobile device user. In other words, in some implementations, media organizer 111 may allow a user of computing device 150 to share some metadata and related information with other users while designating some metadata and related information to be hidden. Metadata associated with specific songs can be hidden or specific information can be hidden with respect to individual songs or a group of songs.

During state (d), the media organizer 111 analyzes the identified metadata 181 in order to organize the user's songs 120 based on the identified metadata 181. In some implementations, the media organizer 111 arranges the common songs 115 in a particular sequence for playback on the mobile device 102, or generates a suggestion to play the songs in a particular order, based on signals indicating the likely preferences of the user of computing device 150. The signals may be determined based on the identified metadata 181. Examples of signals reflecting preferences of a user can include a play count for a particular song, a date the song was last played, a user-specified rating of the song, and the like. An overall score can be generated for each common song based on a combination of the various factors described above that indicate a user's likely taste or preference for a particular song.

In certain instances, the identified metadata 181 can be used in conjunction with metadata 121 reflecting the mobile device user's own preferences to determine a play order for a larger set of songs, including songs that are not among the common songs 115. For examples, a playlist that includes the common songs 115 as well as the other songs in the mobile device user's song collection 120 may be presented to the mobile device user for playback. The location of each of the common songs 115 in the playlist may be based on both the metadata 181 associated with the computing device user as well as metadata 121 associated with the user of mobile device 102. If the metadata 181 from the computing device 150 indicates that the song "If I Could Turn Back Time," for example, is likely not preferred by the computing device user, the song may be placed generally lower on the playlist than songs that are associated with high or neutral ratings, including songs that may not be among the common songs 115 but have higher scores based on the mobile device user's own metadata 121.

The results of the analysis performed during state (d) are conveyed to the mobile device 102 during state (e). In some implementations, the media organizer 111 can generate a playlist with songs in a particular sequence, or the media organizer 111 may also automatically play the mobile device user's songs 120 in a particular sequence based on the analysis during state (d). The actual metadata 181 (or information based on metadata 181) specific to the computing device user can also be presented for viewing to allow the user of mobile device 102 to decide how to order or rate the songs. In certain implementations, prior to presentation, the mobile device user's metadata 121 may be automatically edited based on analysis of the metadata 181 associated with the computing device user.

Figure 2:
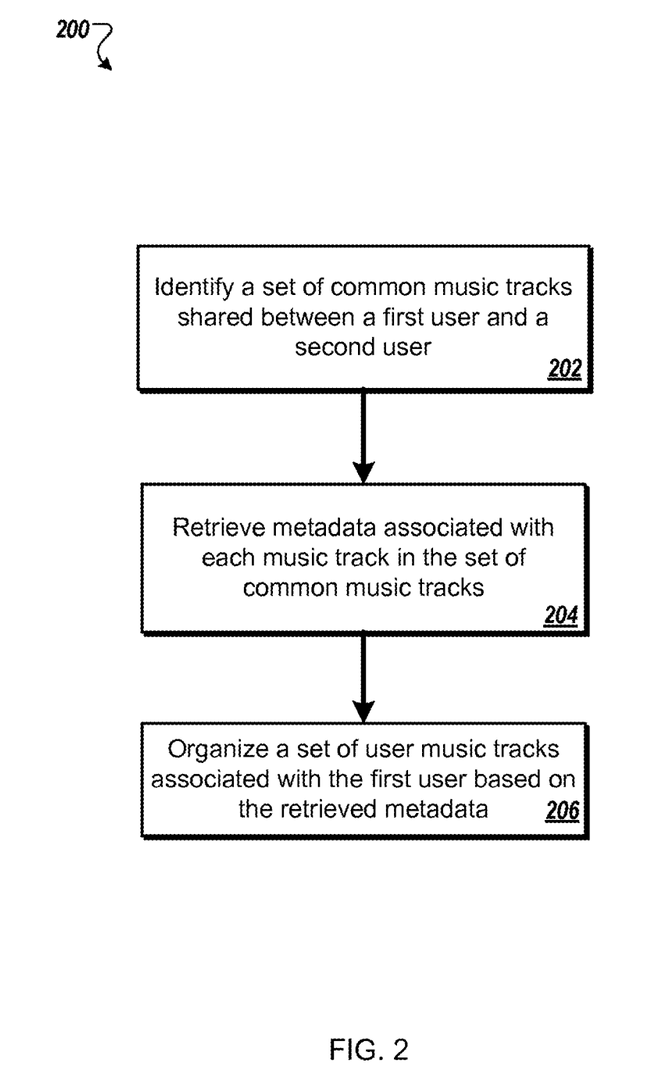
FIG. 2 is a flowchart of an example process for organizing music tracks in accordance with an embodiment.

FIG. 2 is a flowchart of an example process 200, performed by media organizer 111, for organizing music tracks for a first user. In FIG. 2, media organizer 111 identifies a set of common music tracks shared between a first user and a second user at 202. The first and second users may each have their own set of music tracks, which may be stored together in the same location, such as at a server. The first and second users may generally be limited to viewing or listening to their own music tracks. Some music tracks may be present in both users' music collections. Accordingly, the cross-section of their music collections is identified.

Media organizer 111 retrieves metadata associated with each music track in the set of common music tracks at 204. The metadata may be specific to the second user. The metadata for a particular music track can include information regarding at least one category, such as a date the particular music track was last played by the second user, a number of times the particular music track has been played by the second user, or a rating of the particular music track by the second user. In some instances, the metadata can also include information regarding the context in which a particular music track is commonly played, such as a specific location of a user listening to the music track or an activity being performed by the user while listening to the music track. In some instances, metadata may not be available for every music track.

Media organizer 111 organizes a set of user music tracks associated with the first user based on the retrieved metadata at 206. The set of user music tracks corresponds to all or a portion of the user's music collection, which may include the set of common music tracks. The information from the retrieved metadata for the set of common music tracks may be displayed to the user. In some implementations, the first user can sort the common music tracks based on one of the categories represented in the retrieved metadata, as described below with respect to FIG. 3. Not all of the information based on metadata specific to the second user may be displayed to the first user. For example, second user may designate some metadata as hidden to prevent the metadata from being displayed to the first user. Although some of the information from the retrieved metadata may be hidden from view, that metadata may still be used to generate a playlist or determine an order in which music tracks are played to the first user. The set of user music tracks may be automatically played to the first user in an order based on the retrieved metadata.

FIGS. 3A-3E depict example screenshots of user interfaces presented to a user when media files are organized using media organizer 111, as described above in relation to FIGS. 1 and 2. In some implementations, the user interfaces for presenting and organizing media files depicted in FIGS. 3A-3E may be integrated with other applications, such as a media player application, social networking application, chat room application, and the like.

Figure 3A:
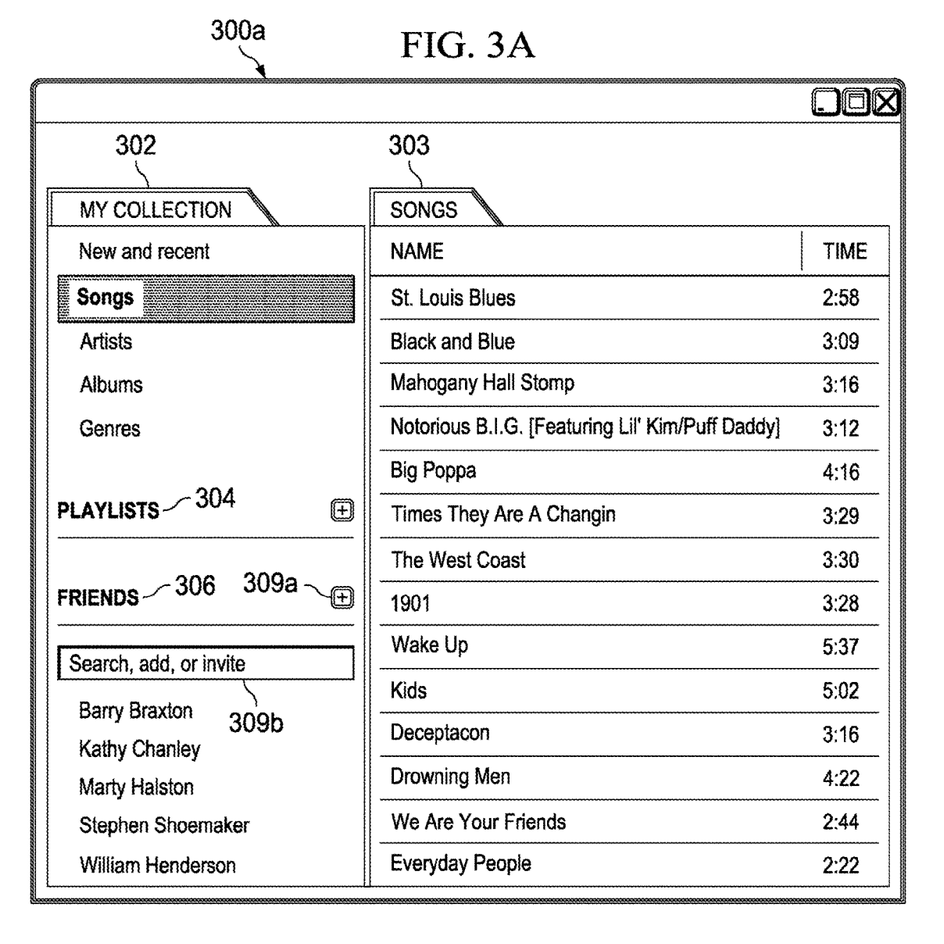
FIGS. 3A-3E are example diagrams of user interfaces presented to a user in accordance with an embodiment.

FIG. 3A illustrates an example screenshot 300a of a display of a user's own music collection 302. A user may view music tracks 303 in the collection by song title, artist, album, or genre, for example. The user can access a playlist 304 to view music tracks that are grouped together or music tracks that are arranged in a particular sequence for playback. The user can also access a list 306 of other users, or friends. The list of friends 306 may include other users who have previously established an online connection with the user, such as through a social network, prior communications, or shared interests, for example. In some instances, the friends may be other users that also have music collections with common songs shared with the user. The metadata associated with friends that have common songs may potentially be used to organize the user's media files. In the illustrated example, the user may add additional friends by clicking on a visual object 309a depicting a "plus" sign, which may bring up an Add Friends dialog box. The user may also add friends using a "Search, add, or invite" box 309b. In some instances, a user can hide the list of friends 306 from view.

Figure 3B:
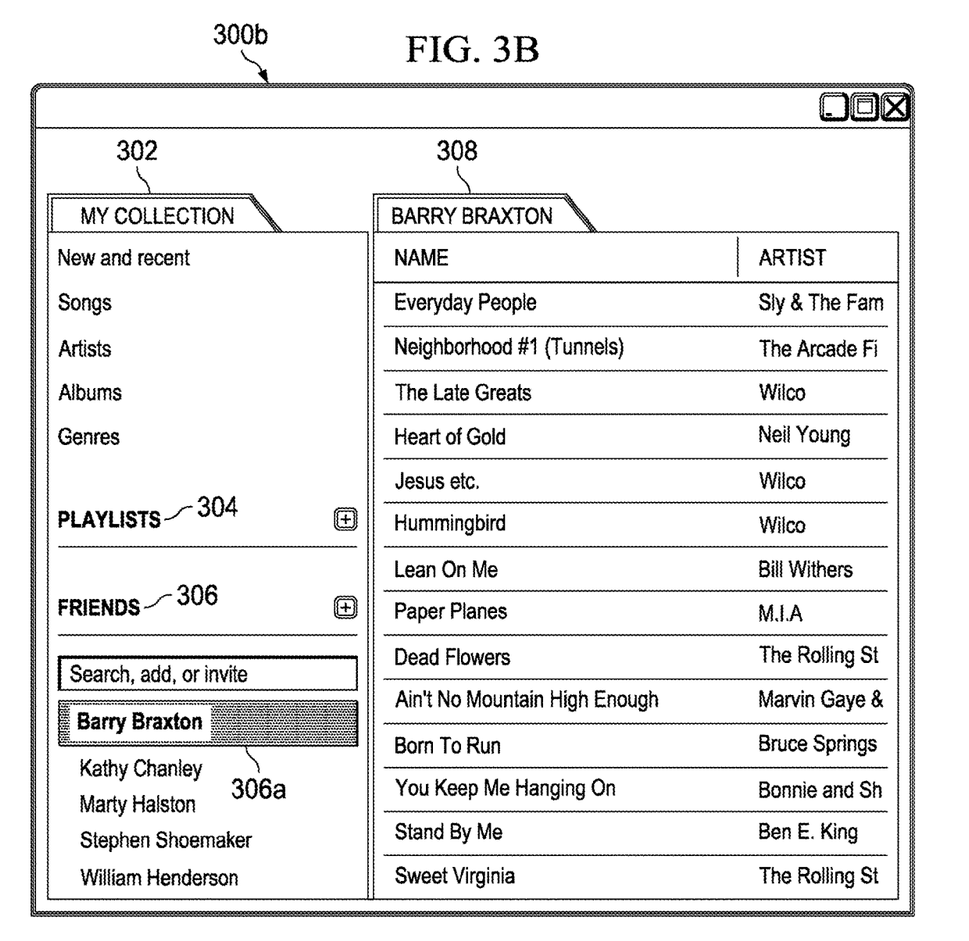

FIG. 3B illustrates an example screenshot 300b of a display of common music tracks shared with one of the user's friends 306a. As depicted in FIG. 3B, a user's selection of the name of one of the friends 306a from the friends list 306 can initiate a request to media organizer 111 to determine and present a list of common music tracks 308 to the user. The common music tracks 308 are the music tracks that are owned by both the user and the friend 306a.

Figure 3C:
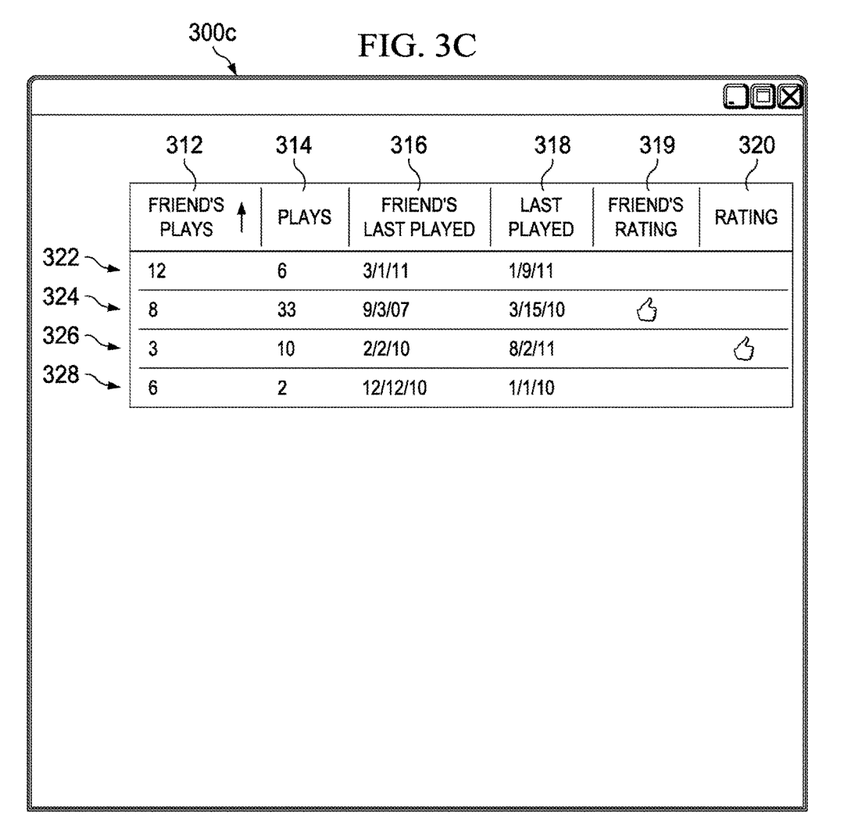

FIG. 3C illustrates an example screenshot 300c of a display of metadata information associated with music tracks shared between two users. As illustrated in FIG. 3, information based on metadata that is specific to both a user and the user's friend 306a can be displayed for a particular music track. In FIG. 3C, rows 322, 324, 326, and 328 represent common music tracks that are present in the user's music collection and the friend's 306a music collection, and columns 312, 314, 316, 318, 319, and 320 represent different categories of metadata information for each music track displayed. The categories may include the friend's number of plays for each music track 312, the user's number of plays for each music track 314, the friend's date of the last play of each music track 316, the user's date of last play of each music track 318, the friend's personal rating of each music track 319, and the user's personal rating of each music track 320.

Figure 3D:
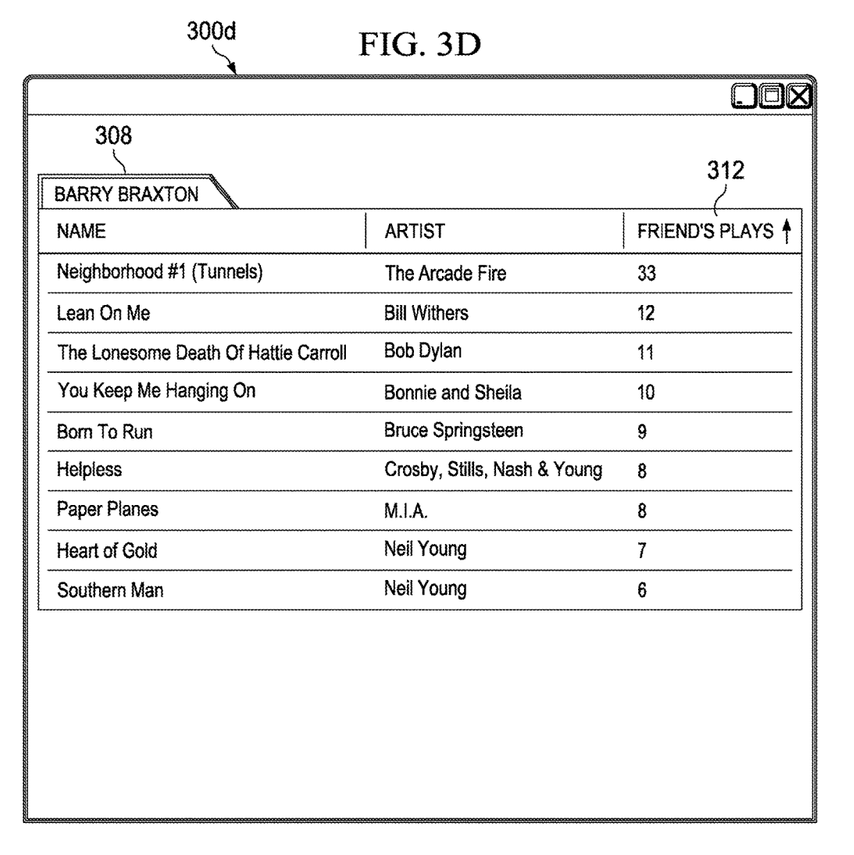

The user may also be allowed to sort the music tracks based on each of the categories. FIG. 3D illustrates an example screenshot 300d of a display of metadata information associated with a user's friend and sorted based on a particular category. The user may arrange the common music tracks in an order based on the friend's number of plays for each music track by selecting the friend's number of plays column 312. The user may also select another column to arrange the order of songs by other metadata categories, as illustrated in FIG. 3C. Accordingly, a user may view the friend's information for the common music tracks so that the user can decide which of the common music tracks to listen to, in what order to listen to them, or how to rate them. As illustrated in FIG. 3C, the user may also view information based on his own metadata for the common music tracks to compare with the friend's metadata or to see the metadata associated with the user that may be displayed to other users. Other metadata categories that are not illustrated in FIG. 3C may also be displayed, such as typical location of a user during playback of each music track or typical activities being performed during playback of each music track.

In addition, or alternatively, the user-specific metadata may be used to determine a general preference score approximating a user's "taste" for a particular music track. The preference score may be used to automatically determine a sequence or frequency for playing the common music tracks to another user. In some implementations, the preference score may be based on one, all, or a combination of metadata categories, such as the ones depicted in FIG. 3C. For each music track, an individual score may be assigned for each of the categories, such as a play count, a last played date, or a personal rating. Music tracks with a greater number of play count, a more recent play date, or a higher personal rating, would receive a higher score for each of those categories. The individual scores for each metadata category can then be combined to form an overall preference score. In certain implementations, different weights can be assigned to individual scores when calculating the overall preference score. The overall preference score may be hidden from users and just used to organize music tracks, or the preference score may also be presented to users in some instances.

Further, a user may be able to access metadata information of common songs from more than one other user. In some instances, a group of users may share common songs, and metadata information from each of the users may be used to organize media files for one or more of the members of the group. A user may be able to view metadata information associated with each of the other members of the group, for example. A group preference score may also be calculated for each music track that includes a combination or average of preference scores associated with different members for each music track.

In some implementations, the media organizer 111 may present a list of suggestions to the user indicating music tracks that the user may not own but that may be owned by one or more of the user's friends 306. The suggested music tracks may be determined based on, for example, a threshold number or percentage of the user's friends 306 who each own particular music tracks that are not owned by the user. The media organizer 111 may also determine suggested music tracks based on information extracted from metadata associated with music tracks owned by the user's friends 306. For example, if a particular music track that is not owned by the user is associated with a high play count or high rating by other friends 306 who own the music track, the media organizer 111 may present the particular music track as a suggested music track for the user to purchase or obtain.

In certain implementations, the media organizer 111 may be configured to present a suggestion of potential friends based on metadata associated with other users that are not included in the user's friend list 306. For example, the media organizer 111 may automatically search for common music tracks that the user shares with other users that are not in the friend list 306. If the number of common music tracks shared between the user and one of the other users exceeds a minimum threshold number or percentage, the media organizer 111 may suggest the other user as a potential friend for the user to add to the friend list 306. The media organizer 111 may also suggest potential friends based on likely preferences of other users extracted from metadata associated with common music tracks. For example, the media organizer 111 may calculate user-specific preference scores for each common music track shared between the user and another user. If the preference scores for the common music tracks are similar, the media organizer 111 may suggest the other user as a potential friend for the user.

Figure 3E:
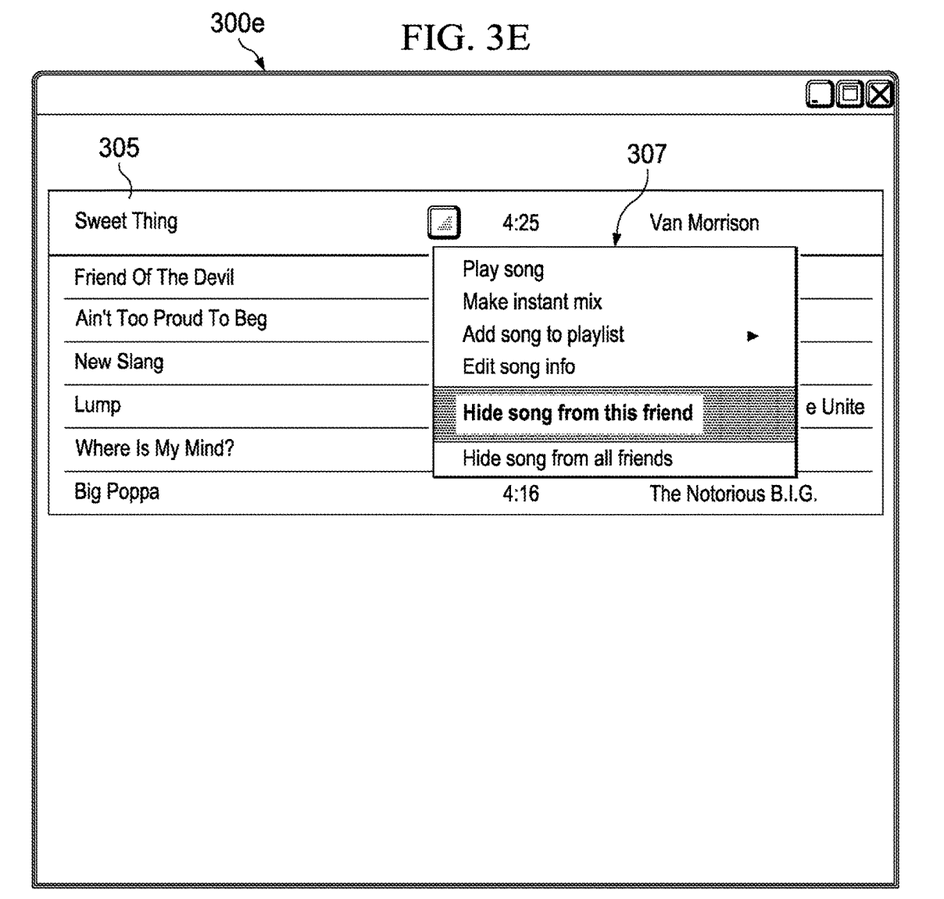

FIG. 3E illustrates a screenshot 300e of options that may be presented to a user for a particular music track. In some implementations, a menu of options 307 for a selected music track 305 may be presented to a user, as illustrated in FIG. 3E. For example, the user may select a particular music track 305, and a menu 307 is presented in response with the option to hide a particular music track from a friend. In certain instances, the user may allow other users to view the music track but hide specific information from the metadata for the music track, such as the number of plays of the music track, the last played date of the music track, or the user's personal rating of the music track. Further, the user may be given the option to change privacy settings to designate who can view common music tracks shared with the user, who can view metadata information specific to the user, or what categories of metadata information are visible. In some implementations, the user may choose among allowing only friends, friends of friends, or anyone to view common music tracks or metadata information. These privacy settings may be applicable to all common music tracks or to a particular music track.

Figure 4:
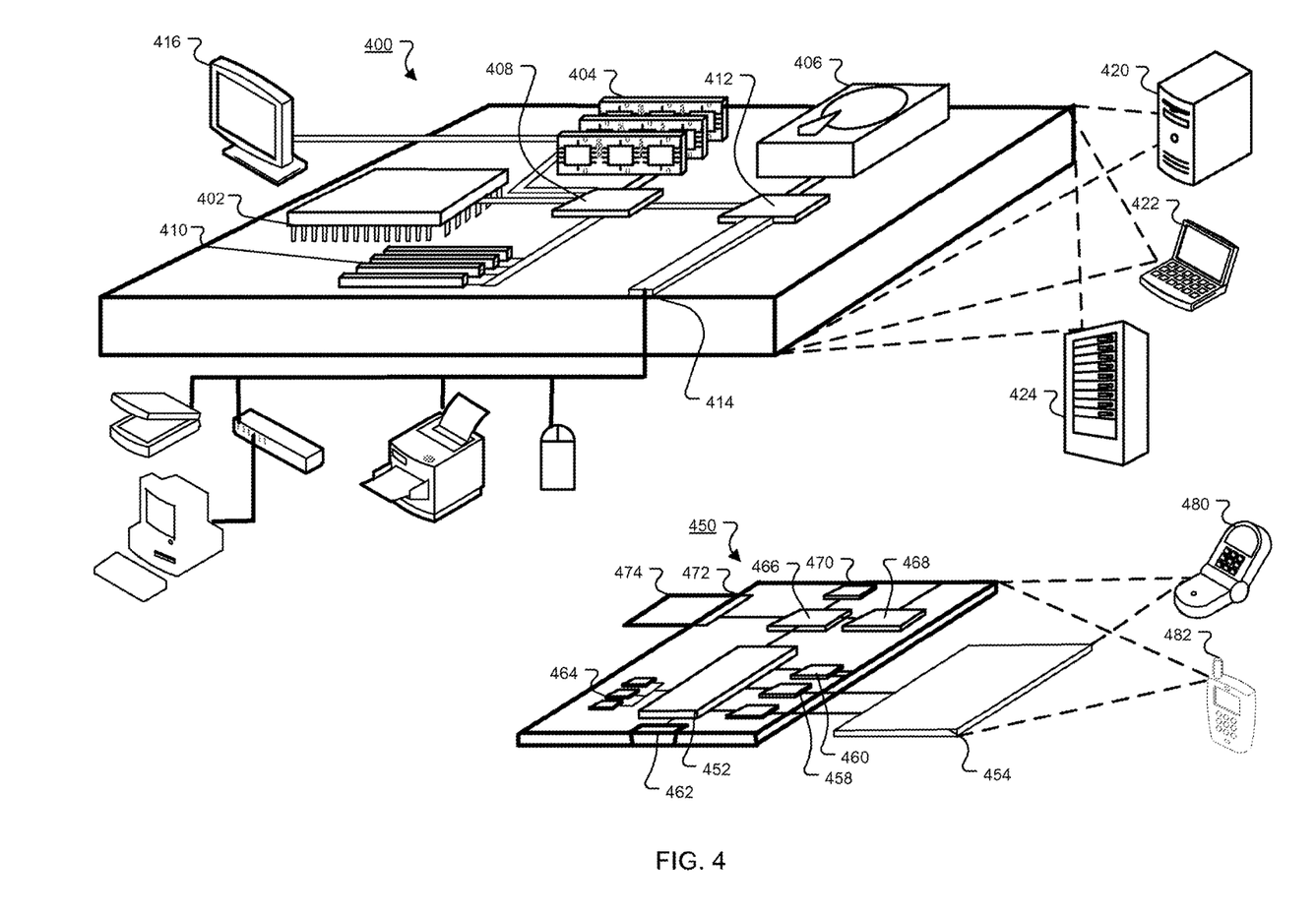
FIG. 4 shows an example of a computer device and a mobile computing device that can be used to implement the processes described herein.

FIG. 4 shows an example of a generic computing device 400 and a generic mobile computer device 450, both which may be used in the process described herein for organizing music files based on shared metadata. For example, computing device 400 may perform the functions of server 142 or computing device 150 and mobile computer device 450 may perform the function of mobile device 102. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution in the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information in the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a computer- or machine-readable medium, such as the memory 404, the storage device 406, memory on processor 402, or a propagated signal. For example, the information carrier may be a non-transitory, machine-readable storage medium.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can execute instructions in the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information in the computing device 450. The memory 464 can be implemented as one or more of a computer-readable medium or media, a volatile memory unit or units, or a non-volatile memory unit or units. Expansion memory 464 may also be provided and connected to device 450 through expansion interface 462, which may include, for example, a SIMM (Single In Line Memory Module) card interface. Such expansion memory 464 may provide extra storage space for device 450, or may also store applications or other information for device 450. Specifically, expansion memory 464 may include instructions to carry out or supplement the processes described above, and may include secure information also. Thus, for example, expansion memory 464 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 464, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or topic object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are in the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also in the scope of the following claims.

What is claimed is:

1. A method performed by at least one processing device, the method comprising:
    identifying a set of common multimedia files associated with a first user and a second user, wherein the set of common multimedia files includes at least one multimedia file present in both a first set of multimedia files associated with the first user and a second set of multimedia files associated with the second user, wherein the first user and the second user are different;
    receiving a request from the second user to hide metadata associated with a particular multimedia file;

retrieving metadata associated with at least one multimedia file in the set of common multimedia files, wherein the retrieved metadata is specific to the second user; and organizing a set of user multimedia files associated with the first user based on the retrieved metadata, wherein organizing the set of user multimedia files includes displaying data to the first user based on retrieved metadata for each of the common multimedia files, and playing the multimedia files based on metadata associated with the particular multimedia file without displaying the metadata to the first user.

2. The method of claim 1, wherein the retrieved metadata associated with the at least one multimedia file in the set of common multimedia files contains information regarding at least one category, the at least one category including a date the particular multimedia file was last played by the second user, a number of times the particular multimedia file has been played by the second user, or a rating of the particular multimedia file by the second user.

3. The method of claim 2, wherein organizing the set of user multimedia files includes displaying at least a portion of the set of user multimedia files in an order based on the at least one category.

4. The method of claim 1, wherein determining the order for playing the multimedia files comprises:
assigning an individual score for at least one category of the retrieved metadata for at least one multimedia file in the set of common multimedia files;
calculating a preference score for the at least one multimedia file based on the individual score for the at least one category; and
determining an order for playing the at least one multimedia file based on the preference score calculated for the at least one multimedia file.

5. The method of claim 1, further comprising:
transmitting results of the organizing of the set of user multimedia files to a client device associated with the first user, wherein the results include at least one of a playlist of at least a portion of the set of user multimedia files or a display of data based on retrieved metadata.

6. The method of claim 1, wherein the set of common multimedia files includes at least one multimedia file shared by the first user with the second user.

7. The method of claim 1, wherein organizing the set of user multimedia files comprises automatically arranging the set of user multimedia files in an order based on the retrieved metadata.

8. The method of claim 7, further comprising automatically playing a first track of the set of user multimedia files according to the order.

9. A system comprising:
one or more processing devices; and
one or more machine-readable media storing instructions that are executable by the one or more processing devices to perform functions comprising:
identifying a set of common multimedia files associated with a first user and a second user, wherein the set of common multimedia files includes at least one multimedia file present in both a first set of multimedia files associated with the first user and a second set of multimedia files associated with the second user, wherein the first user and the second user are different;
receiving a request from the second user to hide metadata associated with a particular multimedia file;

retrieving metadata associated with at least one multimedia file in the set of common multimedia files, the retrieved metadata being specific to the second user; and organizing a set of user multimedia files associated with the first user based on the retrieved metadata, wherein organizing the set of user multimedia files includes displaying data to the first user based on retrieved metadata for each of the common multimedia files, and playing the multimedia files based on metadata associated with the particular multimedia file without displaying the metadata to the first user.

10. The system of claim 9, wherein the data includes one or more categories including at least one of a date the particular multimedia file was last played by the second user, a number of times the particular multimedia file has been played by the second user, or a rating of the particular multimedia file by the second user.

11. The system of claim 9, wherein the functions further comprise:
generating a playlist including at least one multimedia file in the first set of multimedia files, the playlist defining an order for playback of the at least one multimedia file based on the metadata.

12. The system of claim 9, wherein the functions further comprise:
identifying a second set of common multimedia files shared between the first user, the second user, and at least one other user, wherein the second set of common multimedia files includes multimedia files that are present in each of the first set of multimedia files, the second set of multimedia files, and a third set of multimedia files associated with the at least one other user;
retrieving group metadata associated with at least one multimedia file in the second set of common multimedia files, wherein the group metadata includes metadata specific to each of the first user, the second user, and the at least one other user; and
displaying data for the at least one multimedia file in the second set of common multimedia files based on the group metadata.

13. One or more non-transitory machine-readable media storing instructions that, in response to execution by a computing device, cause the computing device to perform operations comprising:
identifying a set of common multimedia files associated with a first user and a second user, wherein the set of common multimedia files includes at least one multimedia file present in both a first set of multimedia files associated with the first user and a second set of multimedia files associated with the second user, wherein the first user and the second user are different;
receiving a request from the second user to hide metadata associated with a particular multimedia file;
retrieving metadata associated with at least one multimedia file in the set of common multimedia files, the retrieved metadata being specific to the second user; and
organizing a set of user multimedia files associated with the first user based on the retrieved metadata,
wherein organizing the set of user multimedia files includes displaying data to the first user based on retrieved metadata for each of the common multimedia files, and playing the multimedia files based on metadata associated with the particular multimedia file without displaying the metadata to the first user.

14. The one or more non-transitory machine-readable media of claim 13, wherein the retrieved metadata associated with the at least one multimedia file contains information regarding at least one category, the at least one category including a date the particular multimedia file was last played by the second user, a number of times the particular multimedia file has been played by the second user, or a rating of the particular multimedia file by the second user.

15. The one or more non-transitory machine-readable media of claim 13, wherein organizing the set of user multimedia files includes displaying data to the first user based on retrieved metadata for at least one of the common multimedia files.

16. The one or more non-transitory machine-readable media of claim 13, wherein the functions further comprise:
   identifying at least one multimedia file in a second set of user multimedia files associated with the second user that is not in the set of user multimedia files associated with the first user; and
   presenting a suggestion to the first user for obtaining the at least one multimedia file based on retrieved metadata for the at least one multimedia file.

17. The one or more non-transitory machine-readable media of claim 13, wherein the order for playing the multimedia files is determined by:
   assigning an individual score for at least one category of the retrieved metadata for at least one multimedia file in the set of common multimedia files;
   calculating a preference score for the at least one multimedia file based on the individual score for the at least one category; and
   determining the order for playing the at least one multimedia file based on the preference score calculated for the at least one multimedia file.

* * * * *